United States Patent
Inagawa

(10) Patent No.: US 10,759,184 B2
(45) Date of Patent: Sep. 1, 2020

(54) DENSITY CORRECTION PROFILE GENERATION METHOD AND IMAGE FORMING DEVICE

(71) Applicant: RISO KAGAKU CORPORATION, Tokyo (JP)

(72) Inventor: Hironori Inagawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/481,653

(22) PCT Filed: Mar. 14, 2018

(86) PCT No.: PCT/JP2018/009987
§ 371 (c)(1),
(2) Date: Jul. 29, 2019

(87) PCT Pub. No.: WO2018/173886
PCT Pub. Date: Sep. 27, 2018

(65) Prior Publication Data
US 2020/0001618 A1    Jan. 2, 2020

(30) Foreign Application Priority Data
Mar. 23, 2017 (JP) ................. 2017-057432

(51) Int. Cl.
*B41J 2/21*    (2006.01)
*B41J 2/20*    (2006.01)
(Continued)

(52) U.S. Cl.
CPC ............... *B41J 2/2139* (2013.01); *B41J 2/12* (2013.01); *B41J 2/2054* (2013.01)

(58) Field of Classification Search
CPC ........... B41J 2/2139; B41J 2/12; B41J 2/2054
See application file for complete search history.

(56) References Cited

U.S. PATENT DOCUMENTS

2009/0244154 A1* 10/2009 Miyamoto ............. B41J 2/2142
                                                         347/15
2012/0242732 A1* 9/2012 Nagahara ............... B41J 2/2142
                                                         347/14

FOREIGN PATENT DOCUMENTS

JP    2009-234018    10/2009
JP    2009-302608    12/2009
(Continued)

OTHER PUBLICATIONS

International Search Report issued in International Patent Application No. PCT/JP2018/009987, dated Apr. 10, 2018; and English-language translation thereof.

(Continued)

*Primary Examiner* — Jason S Uhlenhake
(74) *Attorney, Agent, or Firm* — Greenblum & Bernstein, P.L.C.

(57) ABSTRACT

Density of each pixel is specified from a test pattern for measurement of density distribution, a density profile indicating distribution of the specified density for each pixel is acquired, and a pixel region including a "nozzle of interest" having a certain density difference or more from surrounding pixels and pixels on both sides thereof is extracted as a nozzle region of interest from the acquired density profile. Filters B to E, other than a filter A to be applied for density smoothing processing of pixels that do not belong to the nozzle region of interest, are applied for the density smoothing processing of the pixels in the nozzle region of interest, to generate a profile of a density correction value for eliminating a density difference between respective pixels based on the density profile after the smoothing processing.

4 Claims, 9 Drawing Sheets

(51) Int. Cl.
B41J 2/12 (2006.01)
B41J 2/205 (2006.01)

(56) References Cited

FOREIGN PATENT DOCUMENTS

| | | |
|---|---|---|
| JP | 2012-147126 | 8/2012 |
| JP | 2014-072851 | 4/2014 |

OTHER PUBLICATIONS

International Preliminary Report on Patentability (IPRP) for International Patent Application No. PCT/JP2018/009987, dated Sep. 24, 2019.
Written Opinion of the International Searching Authority for International Patent Application No. PCT/JP2018/009987, dated Apr. 10, 2018; and English-langauge translation thereof.

* cited by examiner

FIG. 6

$$\text{Int.(pixel)} = AP \times \left\{ 0.54 - 0.46\cos\left(\frac{2\pi \times PD}{tap-1}\right) \right\}$$

FIG. 7

| FILTER | APPLIED CONDITION (DISTANCE FROM NOZZLE OF INTEREST) | tap (NUMBER OF TAPS) | AP (PEAK INTENSITY) |
|---|---|---|---|
| A | FOUR OR MORE PIXELS | 11 | 0.0805 |
| B | 3 pixel | 9 | 0.0990 |
| C | 2 pixel | 7 | 0.1296 |
| D | 1 pixel | 5 | 0.1896 |
| E | 0 pixel | 3 | 0.3613 |

DENSITY CORRECTION PROFILE GENERATION METHOD AND IMAGE FORMING DEVICE

TECHNICAL FIELD

The present invention relates to a density correction profile generation method and an image forming device.

BACKGROUND ART

As one of image forming devices, there is an inkjet recording device that forms an image by discharging ink from a plurality of nozzles of an inkjet head to a recording medium conveyed on a conveyance path. In the inkjet recording device, if there are variations in ink discharge characteristics among the respective nozzles, density unevenness is generated in an image due to the size or displacement of positions of dots formed on a recording medium such as printing paper.

Therefore, it has been known to measure the ink discharge characteristics for each nozzle and calculate a density correction value for canceling the variations in the ink discharge characteristics among the nozzles, to correct a density gradation value of a pixel corresponding to each nozzle by using the calculated correction value.

The density correction value can be calculated, for example, by reading by a scanner, a test pattern image formed on the recording medium by ink droplets discharged from each nozzle, and digitizing the variations in the ink discharge characteristics among the nozzles based on a reading result.

However, when the test pattern image is to be read by the scanner, noise may be superimposed on an image signal, for example, because dark color fiber mixed into the printing paper or dirt on a glass placing table on which an original document to be read is placed is read together with the test pattern image. Therefore, smoothing processing such as a moving average is applied to an image signal as the reading result by the scanner to remove a noise component in the image signal.

The smoothing processing with respect to the image signal as the reading result of the test pattern image by the scanner is performed similarly even when variations in high frequency components of density generated between adjacent pixels due to a sharp change of the ink discharge characteristics of the nozzle are included in the image signal as the reading result of the test pattern image by the scanner. The variations in high frequency components of density appear, for example, when the ink discharge characteristics of a certain nozzle are largely different from those of the adjacent nozzles on both sides.

If the variations in the high frequency components of density are included in the image signal as the reading result of the test pattern image by the scanner, even if the density gradation values of pixels corresponding to the respective nozzles are corrected by the density correction value calculated based on the image signal as the reading result by the scanner after the smoothing processing, density unevenness in the image due to variations in the ink discharge characteristics of the high frequency components cannot be sufficiently eliminated.

Therefore, according to Patent Literature 1, it has been proposed to extract a high-frequency band from an image signal as a reading result by a scanner and remove noise components from the extracted high-frequency band of the image signal by a filter or the like, instead of applying the smoothing processing to the image signal as the reading result by the scanner.

According to the proposal disclosed in Patent Literature 1, after the high-frequency band of the image signal having the noise components removed is synthesized with other frequency bands of the image signal, a density correction value of the density gradation value of pixels corresponding to respective nozzles is calculated from the synthesized image signal.

CITATION LIST

Patent Literature

Patent Literature 1: Japanese Patent Laid-Open Publication No. 2014-72851

SUMMARY OF INVENTION

Technical Problem

However, according to the conventional proposal described above, since the smoothing processing is not applied to the image signal as the reading result by the scanner, waveforms of the variations in the ink discharge characteristics of the nozzle appearing in the image signal may not be smoothly connected in a connection portion between the high-frequency band of the image signal having the noise components removed and other frequency bands of the image signal.

In such a case, when the density gradation value of pixels corresponding to the respective nozzles is corrected by the density correction value calculated from the synthesized image signal, an unnatural density difference is generated between a pixel corresponding to the connection portion of the high-frequency band of the image signal as the reading result by the scanner and other frequency bands and surrounding pixels thereof. The density difference generated between the pixel corresponding to the connection portion and the surrounding pixels thereof prevents the density unevenness in an image formed on the recording medium from being appropriately eliminated.

The above problem may occur due to variations in drawing characteristics onto a photosensitive drum by a drawing light source in an electrophotographic image forming device, variations in perforation characteristics with respect to stencil base paper of a thermal head in a stencil-printing image forming device, or the like.

That is, the above problem commonly occurs in image forming devices using various recording methods due to variations in recording characteristics present between recording elements of a recording head that records an image to be printed on a recording medium.

The present invention has been made in view of such conventional problems. It is an object of the present invention to provide a density correction profile generation method that can generate, with appropriate contents, a density correction profile that corrects density unevenness in a printed image caused by variations in the recording characteristics present between recording elements of a recording head at the time of recording an image on a recording medium by the recording elements, and an image forming device suitable for being used at the time of printing an image by using the density correction profile generated by the generation method.

Solution to Problem

In order to solve the above problems, a density correction profile generation method and an image forming device according to one aspect of the present invention comprise: acquiring a density profile indicating density of each pixel corresponding to each of recording elements in an image on a recording medium based on recording characteristics of the respective recording elements; extracting a pixel of interest having a certain density difference or more from surrounding pixels in the image on the recording medium based on the density profile; and generating a density correction profile in which a function of a filter having a waveform with a narrower range of an application target pixel and a larger peak intensity is convoluted in the correction profile as a distance of a pixel from the pixel of interest becomes shorter, based on a correction profile defining density correction contents of each pixel in the image on the recording medium generated based on the density profile, or based on the density profile.

It is possible that the density correction profile generation method and the image forming device according to another aspect of the present invention classify, when extracting the pixel of interest, the pixel of interest into a plurality of pixels according to a density difference pattern from surrounding pixels, and when generating the density correction profile, perform convolution to respectively apply a filter having a waveform corresponding to the density difference pattern in each classification to the density of the pixel of interest and surrounding pixels or to the density correction contents in each classification.

It is possible that the density correction profile generation method and the image forming device according to still another aspect of the present invention acquire, when acquiring the density profile, a printed image of a test pattern for measurement of density distribution to be recorded on the recording medium by the recording head from an image of the test pattern, specify density of each pixel in the printed image of the test pattern by reading the printed image of the test pattern by a scanner, and acquire the density profile from the specified density of each pixel in the printed image of the test pattern.

BRIEF DESCRIPTION OF DRAWINGS

FIG. 6 is an explanatory diagram illustrating a filter function of the respective filters illustrated in FIG. 5 in a general expression.

FIG. 7 is an explanatory diagram illustrating variables in the general expression illustrated in FIG. 6 and application target pixels for each of the filters illustrated in FIG. 5.

DESCRIPTION OF EMBODIMENTS

Embodiments the present invention are described below with reference to the accompanying drawings. Like or equivalent parts and constituent elements in the respective drawings are denoted by like or equivalent reference signs and descriptions thereof are omitted or simplified.

[Electrical Configuration of Line-Type Inkjet Recording Device and Peripheral Devices]

Figure 1:
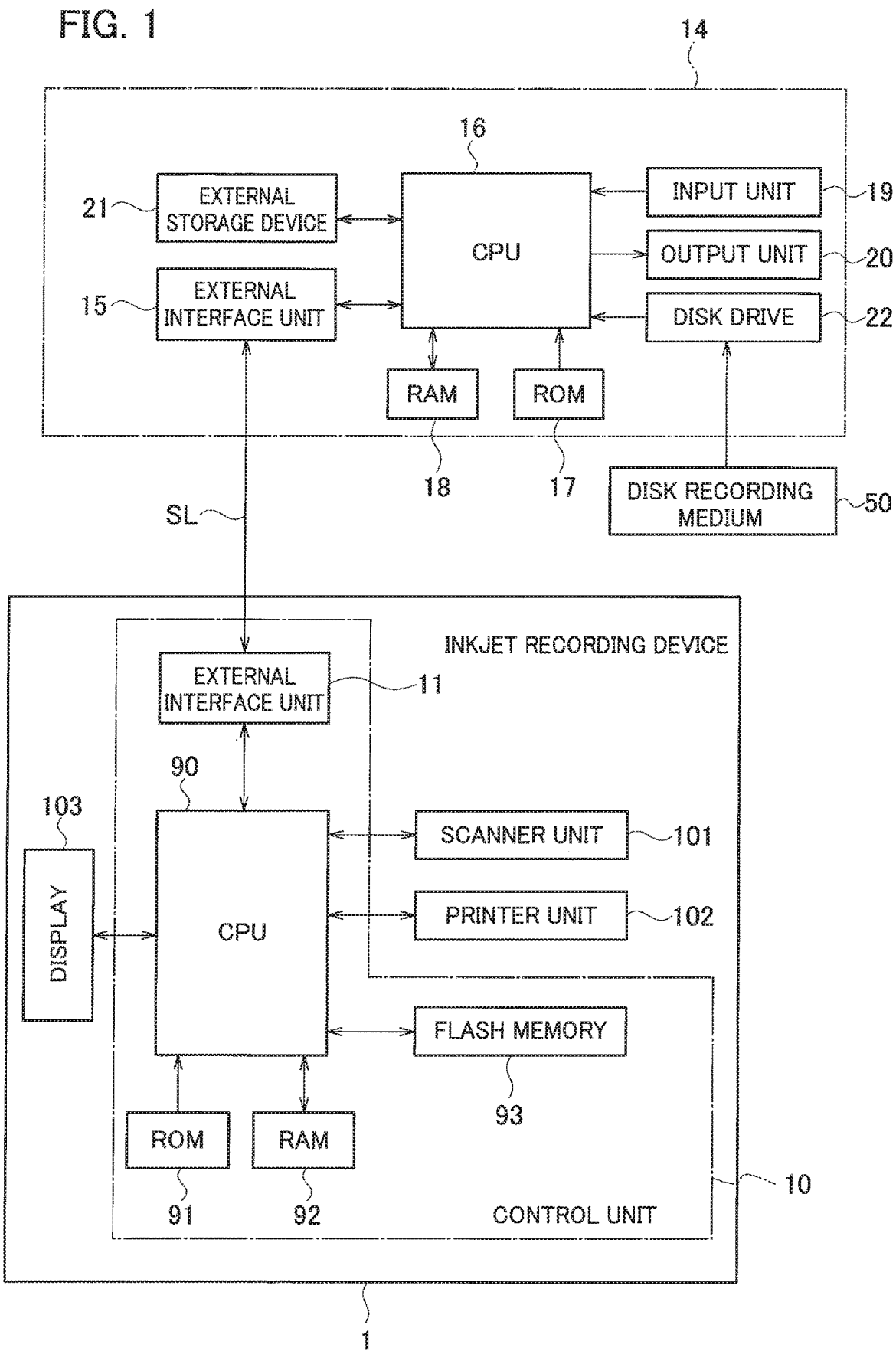
FIG. 1 is a block diagram illustrating a configuration of a control system of a line-type inkjet recording device according to an embodiment of the present invention.

FIG. 1 is a block diagram illustrating a configuration of a control system of a line-type inkjet recording device according to an embodiment of the present invention.

As illustrated in FIG. 1, a line-type inkjet recording device (hereinafter, abbreviated as "inkjet recording device") 1 according to the present embodiment includes a scanner unit 101 that outputs an image signal by reading an original document image on an original document, a printer unit 102 that prints (records) the original document image on printing paper (single side or double sides) based the image signal output from the scanner unit 101, a display 103 for various display inputs, and a control unit 10 for the entire control.

The control unit 10 is connected with an external interface unit 15 of a client terminal 14 described later via an external interface unit 11. The external interface unit 11 and the external interface unit 15 are connected by a communication path SL in a wired or wireless manner.

The control unit 10 receives a printing job of an original document image from the client terminal 14 via the communication path SL, converts image data of the original document image by the received printing job for printing gradation data, and performs printing of the original document image on the printing paper by the printer unit 102 based on the printing gradation data.

The display 103 is connected to a CPU 90 of the control unit 10. The display 103 includes a touch panel and a plurality of key buttons, and can perform various inputs by touching a key displayed on the display 103 on the touch panel or pressing a key button.

The display 103 can use a mode for digitizing an image read from the printing paper by the scanner unit 101 or a mode such as self-diagnosis that uses data of the read image as an input operation unit that a user uses for selective inputs.

The control unit 10 of the inkjet recording device 1 that causes the printer 102 described above to perform a printing operation includes the CPU 90. The CPU 90 controls operations of the scanner unit 101 and the printer unit 102 corresponding to the contents input and set from the display 103 based on a program and setting information stored in a ROM 91.

The control unit 10 is provided with a RAM 92 that functions as a working area for the CPU 90 and a flash memory 93 used for storing various types of firmware and data.

The client terminal 14 is configured by a PC (personal computer) or the like, and includes a CPU 16 that performs various types of processing based on a control program stored in a ROM 17, a RAM 18 that functions as a working area for the CPU 16, an input unit 19 configured by a keyboard, a mouse, and the like, and an output unit 20 configured by a liquid-crystal display or the like.

The CPU 16 is connected with an external storage device 21 that stores therein various application programs, pieces of data, and the like, and a disk drive 22 that reads various programs and data from a disk recording medium 50, other than the external interface unit 15 described above.

When a printing command is input from the input unit 19 during activation of the application program, the CPU 16 generates a printing job by reading data of an original document image to be printed from the external storage device 21, and outputs the printing job to the control unit 10. The CPU 16 that has executed a printer driver program stored in the external storage device 21 functions as a printer driver, thereby enabling to output the printing job to the control unit 10.

Figure 2:
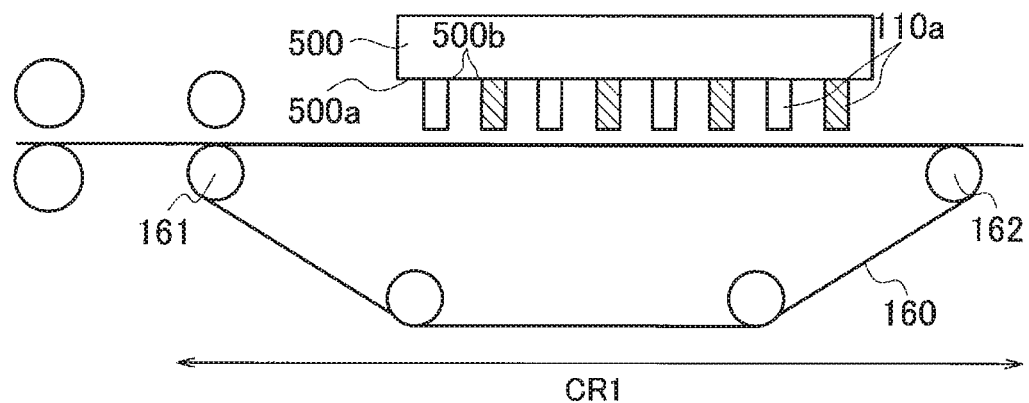
FIG. 2 is an explanatory diagram illustrating a printer unit in FIG. 1 as viewed from a side.
Figure 3:
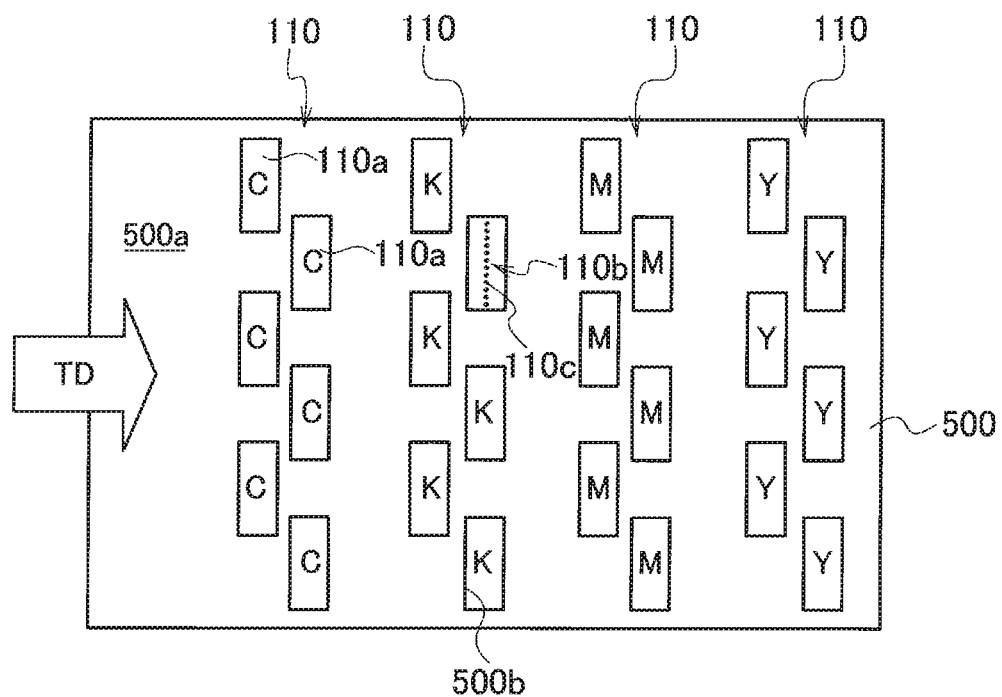
FIG. 3 is an explanatory diagram illustrating a head holder in FIG. 2 as viewed from below.

FIG. 2 is an explanatory diagram illustrating an image forming path CR1, on which image formation is performed, as viewed from the side in the printer unit 102 of the inkjet recording device 1 according to the present embodiment. FIG. 3 is an explanatory diagram illustrating a head holder 500 in FIG. 2 arranged above the image forming path CR1, as viewed from below:

As illustrated in FIG. 2, the printer unit 102 of the inkjet recording device 1 according to the present embodiment includes the image forming path CR1 and a line head 110 being an image forming unit.

The image forming path CR1 is configured by a platen belt 160 being an endless conveyor belt, a drive roller 161 being a drive mechanism of the platen belt 160, a driven roller 162, and the like. In the image forming path CR1, printing paper is conveyed by the platen belt 160 at a speed decided according to printing conditions. The line head 110 is arranged opposite to the platen belt 160 above thereof.

[Configuration and Arrangement of Line Head]

The line head 110 is provided for each color of C (cyan), K (black), M (magenta), and Y (yellow). The line head 110 of each color is configured by a plurality of head modules 110a lined up in a main scanning direction orthogonal to a sub-scanning direction, which is a conveying direction (TD) of the printing paper.

Each head module 110a respectively includes a nozzle line 110b, as schematically illustrated representatively in K (black) as one of the head modules 110a in FIG. 3. Each nozzle line 110b is configured by a plurality of nozzles 110c (corresponding to "recording elements" in the claims) lined up in the main scanning direction. Each nozzle 110c discharges ink of each color for each line to the printing paper on the platen belt 160 to form a plurality of images so as to be superimposed on each other.

The head modules 110a of the line heads 110 of respective colors are held by a head holder 500 arranged above the platen belt 160 as illustrated in FIG. 2. As illustrated in FIG. 3, the head holder 500 is a casing having a head holder surface 500a at the bottom, and a plurality of attachment openings 500b having the head module 110a inserted therein are formed in a plurality of lines in each line head 110 on the head holder surface 500a.

The attachment openings 500b corresponding to the respective line heads 110 are arranged in a zigzag manner, and each attachment opening 500b is formed in the same shape as that of a horizontal cross section of the head module 110a. The head module 110a of each line head 110 is respectively inserted into each attachment opening 500b in the corresponding line so that the side of the nozzle line 110b thereof is projected from the head holder surface 500a as illustrated in FIG. 2.

The head modules 110a of the line heads 110 of respective colors held by the head holder 500 are lined up in the main scanning direction, as illustrated in FIG. 3, and are arranged by shifting the position in the sub-scanning direction in every other line. Accordingly, an interval between the endmost nozzles (not illustrated) of the adjacent two head modules 110a matches with an interval between the adjacent nozzles of the respective head modules 110a.

A plurality of ink chambers (not illustrated) respectively communicating with the respective nozzles 110c are formed in the respective head modules 110a. Ink is supplied to the respective ink chambers, and ink in the respective ink chambers is discharged from the respective nozzles 110c by changing a volume of the respective ink chambers by using, for example, a piezoelectric element.

[Variation in Ink Discharge Characteristics Between Nozzles and Density Change]

As described with reference to FIG. 2, the plurality of nozzles 110c are formed in the head module 110a of the line head 110 of each color. In these nozzles 110c, there may be variations in the ink discharge characteristics even within an allowable range. Variations in the discharge characteristics are generated, for example, by the characteristics of the piezoelectric element in the ink chamber or a manufacturing error of the nozzles 110c within the tolerance.

Figure 4:
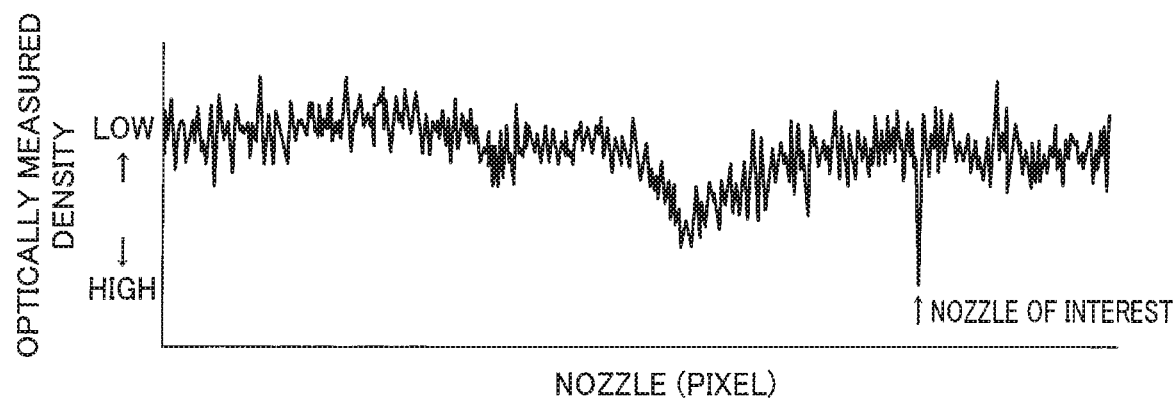
FIG. 4 is a graph illustrating density distribution of respective pixels by discharged ink of respective nozzles, acquired by an image signal read by a scanner unit from a printed image of a test pattern for measurement of density distribution printed by a single color by the printer unit in FIG. 1.

FIG. 4 is a graph illustrating density distribution of respective pixels of an image formed on the printing paper by discharged ink by the respective nozzles 110c of one head module 110a. The density distribution illustrated in the graph of FIG. 4 is acquired by an image signal of a test pattern read by the scanner unit 101 from a printed image of the test pattern for measurement of density distribution printed by a single color by the printer unit 102 in FIG. 1.

The test pattern for measurement of density distribution is an image (test pattern) in which the density gradation values of respective pixels corresponding to the respective nozzles 110c are made the same. The CPU 90 generates and executes a printing job for printing the test pattern for measurement of density distribution by the discharged ink from the respective nozzles 110c of all the head modules 110a of one line head 110, thereby enabling to acquire a printed image of the test pattern.

If there are variations in the distribution as illustrated in FIG. 4 in the density of respective pixels, even if the respective corresponding nozzles 110c respectively discharge ink with respect to pixels having the same density gradation value on the printing paper, a density difference occurs between the pixels on the image printed on the printing paper (printed image).

Therefore, to eliminate variations in the density distribution illustrated in FIG. 4, it is necessary to correct the ink discharge amount discharged respectively by the respective nozzles 110c corresponding to respective pixels according to the density of respective pixels.

[Correction of Ink Discharge Amount of Nozzle and Correction Profile]

For density correction to be performed to eliminate variations in the density distribution, a correction profile regarding the respective nozzles 110c of all the head modules 110a of one line head 110 can be used. The correction profile indicates a correction value of the ink discharge amount (density correction value) of the respective nozzles 110c corresponding to respective pixels, and is generated based on the density distribution in FIG. 4.

The correction profile can be generated by obtaining a correction amount of density that cancels a density difference between respective pixels in the density profile. The density profile defines the density of respective pixels on the printed image printed on the printing paper, and can be generated from the density of each pixel in the image signal of the test pattern read by the scanner unit 101 from the printed image of the test pattern.

Variations in the density between pixels corresponding to the respective nozzles 110c can be canceled by correcting the ink discharge amount of the respective nozzles 110c by using the density correction value in the correction profile (corresponding to "density correction contents" in the claims).

Since variations in the density between pixels by the discharged ink of the respective nozzles 110c are canceled by the density correction, noise may be superimposed on the image signal of the test pattern output from the scanner unit 101 when the scanner unit 101 reads the printed image of the test pattern.

For example, when the scanner unit 101 reads the printed image of the test pattern, noise is superimposed, because dark color fiber mixed into the printing paper or dirt on the glass placing table on which an original document to be read is placed is read together with the test pattern.

Therefore, smoothing processing such as the moving average is applied to the density of respective pixels in the density profile acquired from the image signal in the reading result of the test pattern by the scanner unit 101 to remove a noise component in the image signal.

[Smoothing Processing of Density Profile]

When there is a large density difference with respect to the density of surrounding pixels as in the pixel indicated by an arrow of "nozzle of interest" in FIG. 4, if the smoothing processing is applied to the density of respective pixels in the density profile acquired from the image signal in the reading result of the test pattern by the scanner unit 101, the density difference between the pixel of the "nozzle of interest" (corresponding to "pixel of interest" in the claims) and the surrounding pixels is decreased by the smoothing processing.

Due to this decrease, the density correction value of the correction profile with respect to the pixel of the "nozzle of interest" is also decreased to become a small value, and thus even if density correction is performed, a density difference remains between the pixel of the "nozzle of interest" and the surrounding pixels in the printed image.

Therefore, in the inkjet recording device 1 according to the present embodiment, a waveform of a filter to be used for the smoothing processing is changed according to a distance between the pixel subjected to density correction and the pixel of the "nozzle of interest".

Figure 5:
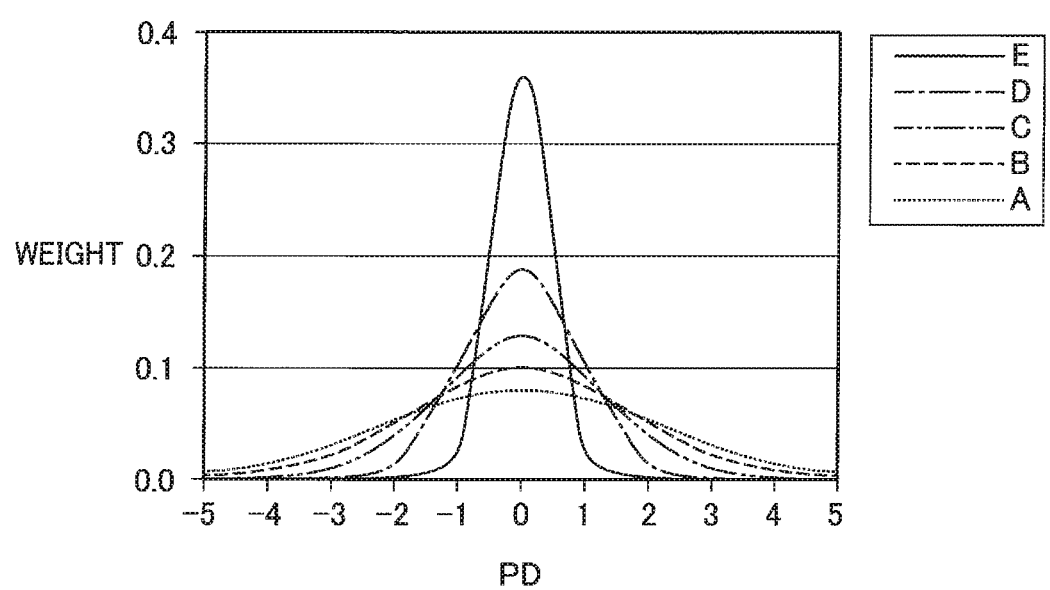
FIG. 5 is a graph illustrating a waveform example of a filter to be applied to a density correction value of an ink discharge amount of the respective nozzles having the density distribution illustrated in FIG. 4.

FIG. 5 is a graph illustrating a waveform example of a filter to be applied to the density correction value of the ink discharge amount of the respective nozzles 110c having the density distribution illustrated in FIG. 4.

In FIG. 5, waveforms of five types of filters A to E having the number of taps and peak values different from each other are illustrated. The respective filters A to E are selectively used according to the distance between the pixel subjected to density correction and the pixel of the "nozzle of interest".

FIG. 6 is an explanatory diagram illustrating a filter function of respective filters A to E illustrated in FIG. 5 in a general expression. The respective filters A to E have values of the number of taps (tap) and the peak intensity (AP) different from each other, which are variables of a filter function (Int.(pixel)) represented by the general expression illustrated in FIG. 6.

FIG. 7 is an explanatory diagram illustrating variables in the general expression illustrated in FIG. 6 and application target pixels for each of the filters A to E.

As illustrated in FIG. 7, the filter A has tap=11 as the number of taps and AP=0.0805 as the peak intensity. The filter B has tap=9 as the number of taps and AP=0.0990 as the peak intensity. The filter C has tap=7 as the number of taps and AP=0.1296 as the peak intensity. The filter D has tap=5 as the number of taps and AP=0.1896 as the peak intensity. The filter E has tap=3 as the number of taps and AP=0.3613 as the peak intensity.

The filter A is applied to pixels having a distance of four or more pixels from the pixel of the "nozzle of interest", and the filter B is applied to pixels having a distance of three pixels from the pixel of the "nozzle of interest". Similarly, the filters C to E are applied to respective pixels having a distance of two pixels, one pixel, or zero pixel from the pixel of the "nozzle of interest", respectively.

Figure 8:
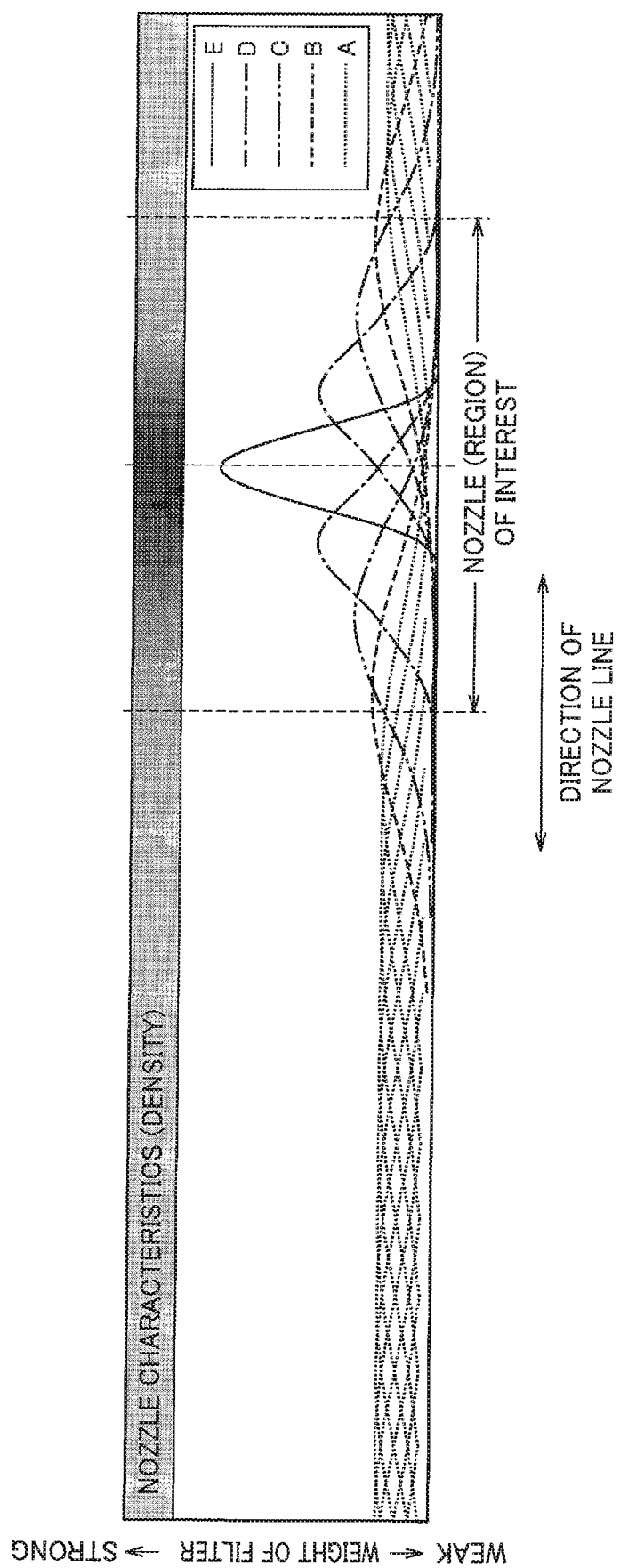
FIG. 8 is an explanatory diagram schematically illustrating weight distribution of correction density of a density correction value in respective pixels when the respective filters illustrated in FIG. 5 are selectively used according to the distance from a pixel of a nozzle of interest, together with density distribution before the density correction in each pixel, for a range of a part of nozzles.

FIG. 8 is an explanatory diagram schematically illustrating weight distribution in respective pixels when the respective filters A to E are selectively used according to the distance from the pixel of the "nozzle of interest", together with density distribution before density correction in each pixel, for a range of a part of nozzles 110c.

As is obvious from FIG. 8, in the inkjet recording device 1 according to the present embodiment, as a distance of a pixel from the pixel of the "nozzle of interest" becomes shorter, a filter having a waveform with a fewer number of taps and a larger peak intensity, that is, a filter having a strong weight on the density of the pixel is used for density smoothing processing of respective pixels in the density profile illustrated in FIG. 4.

[Density Correction Using Density Correction Profile]

If the smoothing processing is applied to the density of each pixel in the density profile illustrated in FIG. 4 by using the filter having the weight distribution illustrated in FIG. 8, a density correction profile can be generated from the smoothed density profile according to the same procedure as the correction profile.

A density correction value of the density correction profile generated in this manner becomes a value that largely lowers the density of the density profile in the pixel of the "nozzle of interest" having a large density difference from the surrounding pixels, and becomes a value that decreases a density difference from the density of the surrounding pixels in other pixels.

Figure 9:
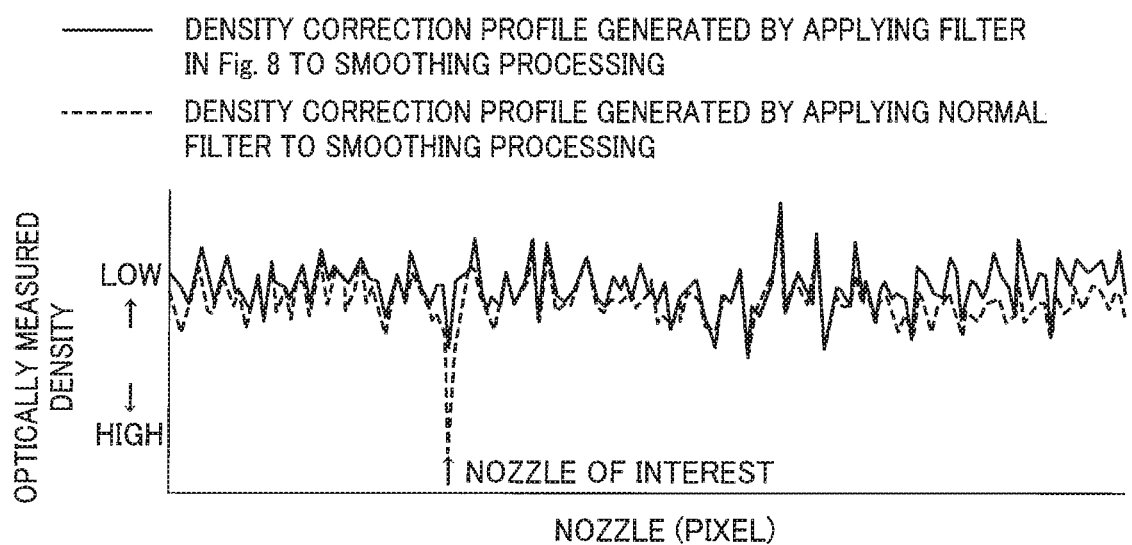
FIG. 9 is a graph illustrating density distribution of discharged ink, which has been subjected to density correction by applying a density correction profile generated from a density profile after smoothing processing.

FIG. 9 is a graph illustrating density distribution of discharged ink from the respective nozzles 110c, which has been subjected to density correction by applying the density correction profile generated from the density profile after the smoothing processing.

A broken line in FIG. 9 indicates a case in which the filter A having the lowest peak intensity illustrated in FIG. 5 is applied to perform smoothing processing with respect to the density of respective pixels in the density profile illustrated in FIG. 4. A solid line indicates a case in which the filter illustrated in FIG. 8 is applied to perform smoothing processing with respect to the density of respective pixels in the density profile illustrated in FIG. 4.

First, if the filter A having the lowest peak intensity illustrated in FIG. 5 is applied to perform smoothing processing with respect to the density of respective pixels in the density profile illustrated in FIG. 4, the density difference between the pixel of the "nozzle of interest" and the surrounding pixels is decreased by the smoothing processing. Therefore, the density of discharged ink of the "nozzle of interest", whose density has been corrected by applying the density correction profile generated from the density profile after the smoothing processing, is maintained substantially to the same level as that before the density correction, as indicated with the broken line in FIG. 9.

On the other hand, if the filter illustrated in FIG. 8 is applied to perform the smoothing processing with respect to the density of respective pixels in the density profile in FIG. 4, the density difference between the pixel of the "nozzle of interest" and the surrounding pixels is not decreased even by performing the smoothing processing. Therefore, the density of discharged ink of the "nozzle of interest", whose density has been corrected by applying the density correction profile generated from the density profile after the smoothing processing, becomes density in which the density difference from the surrounding pixels is decreased, as compared with the density before the density correction, as indicated with the solid line in FIG. 9.

[Processing Example by Inkjet Recording Device]

A procedure when the density correction profile described above is generated by the CPU 90 of the inkjet recording device 1 according to the present embodiment by executing the program stored in the ROM 91 is described with reference to the flowchart of FIG. 10.

Figure 10:
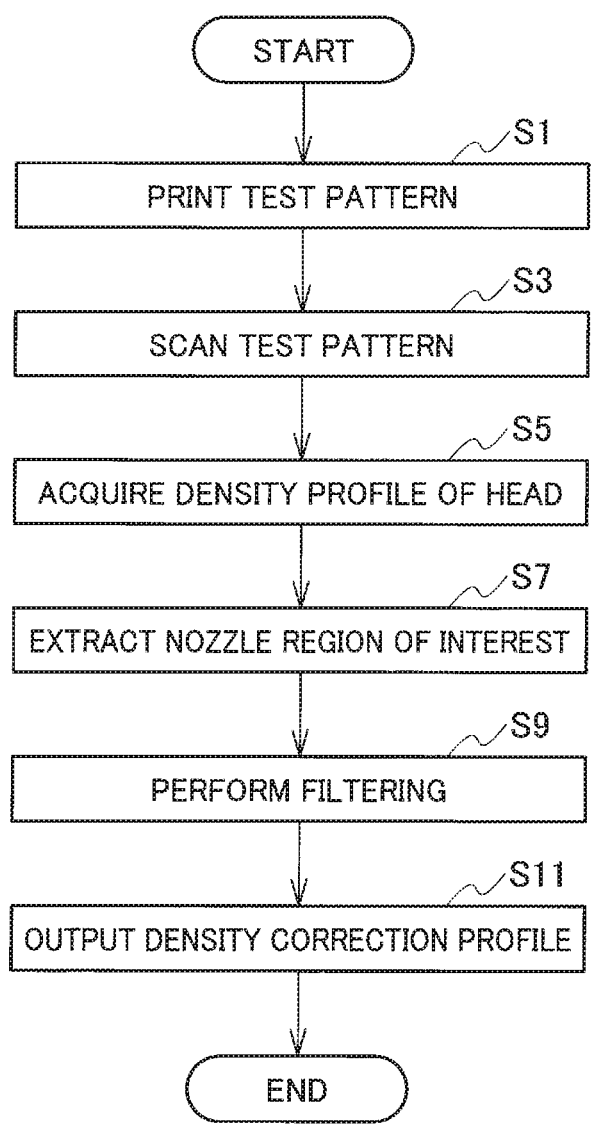
FIG. 10 is a flowchart illustrating a procedure when the density correction profile described above is generated by a CPU of the line-type inkjet recording device in FIG. 1 by executing a program stored in a ROM.

As illustrated in FIG. 10, the CPU 90 first generates a printing job for printing a test pattern for measurement of density distribution, and causes the printer unit 102 to print the test pattern on printing paper (Step S1). For example, the CPU 90 is instructed to cause printing of the test pattern to be executed by an input operation on the display 103.

The CPU 90 causes the scanner unit 101 to read (scan) a printed image of the test pattern from the printing paper on which the test pattern is printed (Step S3). The CPU 90 specifies the density of each pixel from the printed image of the test pattern read by the scanner unit 101, to acquire a density profile indicating distribution of the specified density for each pixel (Step S5).

Subsequently, the CPU 90 extracts, as a nozzle region of interest, a pixel region of seven pixels in total, including a pixel of the "nozzle of interest" having a certain density difference or more from surrounding pixels and three pixels on each side thereof, from the acquired density profile (Step S7). The filters B to E, other than the filter A in FIG. 5 to be applied for density smoothing processing of other pixels, are applied for the density smoothing processing of the pixels in the nozzle region of interest.

Therefore, the CPU 90 applies the filters B to E in FIG. 5 to respective pixels in the nozzle region of interest, correspondingly to the distance from the pixel of the "nozzle of interest", and applies the filter A in FIG. 5 to other pixels, to perform filtering for smoothing the density of respective pixels (Step S9). Specifically, filtering is performed by convoluting functions of the filters A to E to be applied to the respective pixels into the density profile.

The CPU 90 generates the density correction profile based on the density profile after filtering (the density profile after the smoothing processing) according to the same procedure as the correction profile, and causes the generated density correction profile to be memorized in a density correction profile storage area of the flash memory 93 (corresponding to "profile memory unit" in the claims) (Step S11), to end a series of processing.

As is obvious from the above descriptions, according to the present embodiment, Step S1 in the flowchart of FIG. 10 corresponds to "test pattern printing step" and "test pattern acquiring unit" in the claims. Further, according to the present embodiment, Step S3 and Step S5 in FIG. 10 correspond to "pixel density specifying step" and "density profile acquiring step", and "pixel density specifying unit" and "density profile acquiring unit" in the claims.

Further, according to the present embodiment, Step S7 in FIG. 10 corresponds to "pixel-of-interest extracting step" and "pixel-of-interest extracting unit" in the claims. Furthermore, according to the present embodiment, Step S9 in FIG. 10 corresponds to "filtering step" and "filtering unit" in the claims.

In the inkjet recording device 1 according to the present embodiment, for example, when a printing job from the client terminal 14 is input to the external interface unit 11, the density gradation value regarding the respective pixels in printing data generated by the CPU 90 from the printing job is corrected by the density correction value of the density correction profile memorized in the density correction profile storage area of the flash memory 93. The printing job is then executed by using the printing data with the density gradation value being corrected.

According to the inkjet recording device 1 of the present embodiment described above, the filters A to E in FIG. 5 having the number of taps and peak values different from each other are selectively used according to the distance from the pixel of the "nozzle of interest" to perform the density smoothing processing of each pixel. Specifically, as a distance of a pixel from the pixel of the "nozzle of interest" becomes shorter, a filter having a waveform with a fewer number of taps and a larger peak intensity is used, and as a distance of a pixel from the pixel of the "nozzle of interest" becomes longer, a filter having a waveform with a larger number of taps and a smaller peak intensity is used, to perform the density smoothing processing of each pixel.

Therefore, as a pixel has a shorter distance from the pixel of the "nozzle of interest", the degree of reflection of a density difference from surrounding pixels in the density correction value of the correction profile gradually increases continuously, thereby smoothly increasing the degree of suppression of smoothing of the density correction value of the correction profile.

Accordingly, density unevenness in the printed image can be appropriately decreased by the density correction value of the density correction profile generated based on the density of the density profile using the filter E in FIG. 5 in which smoothing is suppressed, with respect to the pixel of the "nozzle of interest".

Further, with respect to pixels other than the pixel of the "nozzle of interest", even if the filter to be used for the smoothing processing is a filter having a waveform different from the filter to be used for the smoothing processing of the pixel of the "nozzle of interest", in which smoothing is suppressed, density unevenness in the printed image can be smoothly corrected so that an unnatural density difference is not generated between the pixel of interest and the surrounding pixels due to the smoothed density correction value.

Therefore, according to the inkjet recording device 1 of the present embodiment, a density correction profile having appropriate contents can be generated.

Further, according to the inkjet recording device 1 of the present embodiment, test pattern printing is performed to print a test pattern for measurement of density distribution on printing paper by an input from the display 103, and the scanner unit 101 reads a printed image of the printed test pattern. A density profile of each pixel is generated from image data in a reading result, and a density correction profile is generated based on the density profile and memorized in the density correction profile storage area of the flash memory 93.

Therefore, if the ink discharge characteristics of the respective nozzles 110c change due to replacement or the like of, for example, the head module 110a, a new density correction profile can be generated to update an old density correction profile in the density correction profile storage area of the flash memory 93.

According to the present embodiment, the density of the density profile is smoothed by the filters A to E corresponding to the distance from the pixel of the "nozzle of interest", and a density correction value of the density correction profile is generated from the density of the density profile after the smoothing processing.

However, it is allowable that density correction value of the correction profile is first obtained from the density of the density profile, and the obtained density correction value is smoothed by the filters A to E corresponding to the distance from the pixel of the "nozzle of interest" to generate the density correction value of the density correction profile.

According to the embodiment described above, the inkjet recording device 1 that performs printing in an inkjet method has been described as an example. However, the present invention can be also applied to an image forming device using a method other than the inkjet method.

Figure 11:
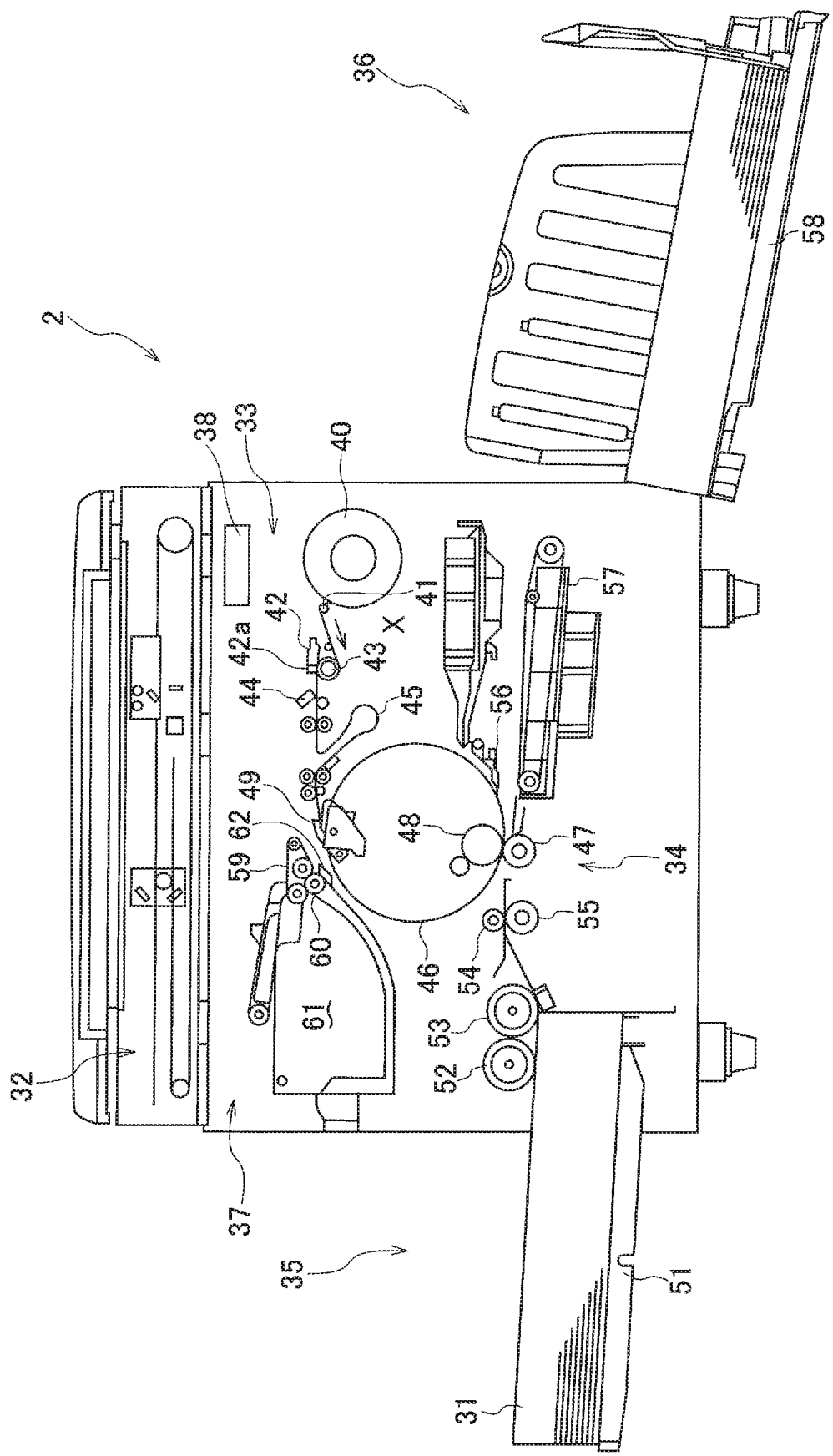
FIG. 11 is a schematic sectional view illustrating an internal configuration of a stencil printing device according to another embodiment of the present invention.

FIG. 11 is a schematic sectional view illustrating an internal configuration of a stencil printing device according to another embodiment of the present invention.

[Entire Configuration of Stencil Printing Device]

In a stencil printing device 2 illustrated in FIG. 11, image data of a printing job input from an external device or a printing job generated by reading an original document image by an original document reading mechanism 32 (scanner) is processed by a control unit 38 based on printing setting information of the printing job.

A thermal head 42 (corresponding to "recording head" in the claims) of a plate making mechanism 33 perforates stencil base paper 45 fed from a paper roll 40 by a platen roller 43 via a guide roller 41 in a pattern according to the original document image, based on the processed image data.

The stencil base paper 45 made up by perforation is cut by a paper cutter 44 and wound around a plate cylinder 46 of a printing mechanism 34. Ink supplied to outside of the plate cylinder 46 by a squeegee roll 48 in the plate cylinder 46 facing a press roll 47 is supplied from a rear surface side to a surface side of the stencil base paper 45 on the plate cylinder 46 through perforations.

The ink supplied to the surface side of the stencil base paper 45 is transferred to printing paper 31 fed from a feeder 51 of a feed mechanism 35 by a scraper 52 and a pickup roll 53 and conveyed to the plate cylinder 46 by a guide roll 54 and a timing roll 55, thereby printing the original document image (corresponding to "printed image" in the claims) on the printing paper 31.

The thermal head 42 includes a large number of heating elements 42a (corresponding to "recording elements" in the claims), and the respective heating elements 42a are heated by control of the control unit 38, to perforate locations corresponding to respective pixels in the original document image in the stencil base paper 45, respectively.

The printed printing paper 31 is stripped off from the plate cylinder 46 by a paper stripping claw 56 of a paper ejection mechanism 36, conveyed to a stacker unit 58 by a paper conveying mechanism 57 and stacked therein. After the printed stencil base paper 45 is released from a base paper clamp unit 49 of the plate cylinder 46, the stencil base paper 45 is guided by a plate ejection guide belt 59 of a plate ejection mechanism 37, pulled off from the plate cylinder 46, and collected in a plate ejection box 61 by a plate ejection roller 60.

A contamination control guide 62 prevents a new stencil base paper 45 wound around the plate cylinder 46 from coming in contact with the plate ejection roller 60.

[Variations in Perforation Characteristics of Thermal Head and Density Change]

In the stencil printing device 2 configured as described above, if there are variations in the perforation characteristics in the stencil base paper 45 by the respective heating elements 42a of the thermal head 42, perforations having different diameters are formed in locations corresponding to pixels having the same density gradation value on the stencil base paper 45. If the original document image is printed on the printing paper 31 by using the perforated stencil base paper 45, a density difference is generated between pixels in the original document image on the printing paper 31.

Therefore, also in the stencil printing device 2, to prevent that a density difference is generated between pixels in the printed image on the printing paper 31, it is necessary to correct the heating value of the respective corresponding heating elements 42a of the thermal head 42 that respectively perforate locations corresponding to the respective pixels on the stencil base paper 45 according to a density difference between the pixels.

[Density Correction Using Density Correction Profile and Processing Example by Stencil Printing Device]

In order to correct the heating value, as in the above embodiment, a printed image of a test pattern printed on the printing paper 31 by using the stencil base paper 45 perforated by all the heating elements 42a of the thermal head 42 (corresponding to Step S1 in FIG. 10) is read by the original document reading mechanism 32 (corresponding to Step S3 in FIG. 10) under control of the control unit 38.

The density of each pixel of an image formed on the printing paper 31 is specified based on the density of each pixel in the image signal of the read test pattern, to acquire a density profile indicating distribution of the specified density for each pixel (corresponding to Step S5 in FIG. 10).

Further, a pixel region of seven pixels in total, including a pixel of interest having a certain density difference or more from surrounding pixels and three pixels on each side thereof, is extracted as a pixel region of interest from the acquired density profile (corresponding to Step S7 in FIG. 10). The filters B to E, other than the filter A in FIG. 5 to be applied for density smoothing processing of other pixels, are applied for the density smoothing processing of the pixels in the pixel region of interest.

Therefore, the control unit 38 applies the filters B to E in FIG. 5 to respective pixels in the pixel region of interest according to the distance from the pixel of interest, and applies the filter A in FIG. 5 to other respective pixels, to perform filtering for smoothing the density of respective pixels (corresponding to Step S9 in FIG. 10).

The control unit 38 generates a density correction profile based on the density profile after filtering (the density profile after the smoothing processing) according to the same procedure as the correction profile, and causes the generated density correction profile to be memorized in a non-volatile memory (corresponding to "profile memory unit" in the claims) (not illustrated) provided in the control unit 38 (corresponding to Step S11 in FIG. 10), to end a series of processing.

The correction profile indicates a correction value of the heating value (heating value correction value) of the respective heating elements 42a of the thermal head 42 corresponding to respective pixels, so that the respective pixels in the original document image have the same density on the printing paper 31.

The correction profile described above can be generated by obtaining a correction amount of the density that cancels a density difference between respective pixels in the density profile. The density profile defines the density of each pixel on the printed image printed on the printing paper, and can be generated based on the density of each pixel in the image signal of the test pattern read from the printed image of the test pattern by the original document reading mechanism 32.

Variations in the density between pixels corresponding to the respective heating elements 42a can be canceled by correcting the heating value of the respective heating elements 42a of the thermal head 42 by using the heating value correction value of the correction profile described above (corresponding to "density correction contents" in the claims).

Figure 12:
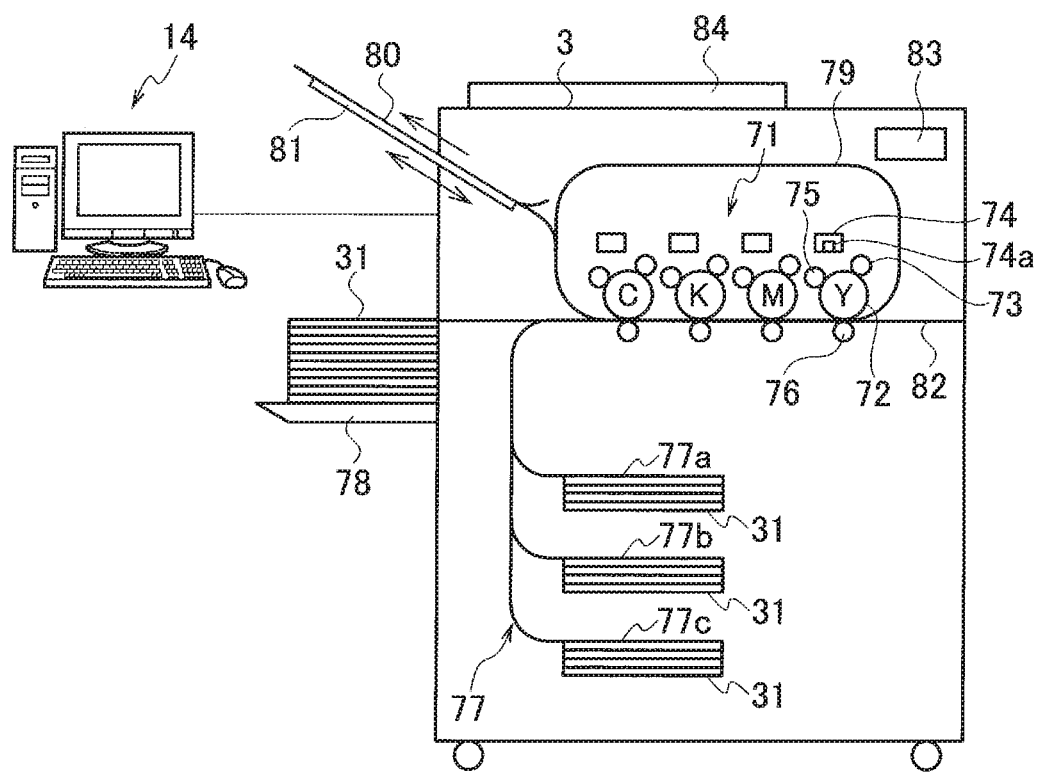
FIG. 12 is an explanatory diagram illustrating a schematic configuration of a laser beam printer according to still another embodiment of the present invention.

FIG. 12 is an explanatory diagram illustrating a schematic configuration of a laser beam printer according to still another embodiment of the present invention.

[Schematic Configuration of Electrophotographic Image Forming Device]

In an electrophotographic image forming device 3 illustrated in FIG. 12, a printing unit 71 forms a latent image on a photosensitive drum 72 charged by a charging roller 73 by drawing light of a writing unit 74.

The writing unit 74 includes a large number of LEDs (light-emitting diodes) 74a (corresponding to "recording elements" in the claims) as a drawing light source, and the respective LEDs 74a are lighted under control of a control unit 83 to expose respective locations corresponding to the respective pixels in the original document image on the photosensitive drum 72.

Toner is adsorbed on the latent image by a developing roller 75 to visualize a toner image, and the visualized toner image is transferred onto printing paper 31 conveyed from a paper feed tray 77 (first to third paper feed trays 77a to 77c) and a straight paper feed stand 78 to a printing unit 71 by a circulating conveyance path 79 by a transfer roller 76. A series of processes of from formation to transfer of a latent image are respectively performed independently for each color of CKMY.

The printing paper 31 on which the toner image is transferred and an original document image is printed is conveyed to a paper ejection tray 80 by the circulating conveyance path 79 and ejected, in the case of single-side printing. In the case of double-sided printing, the printing paper 31 is reversed upside down by a reversing unit 81 on a back side of the paper ejection tray 80 and conveyed again to the printing unit 71 by the circulating conveyance path 79.

When post processing (bookbinding, enclosing and sealing, stapling, punching, and the like) is to be performed by a post-processing device (not illustrated), the printing paper 31 after printing is conveyed to the post-processing device (not illustrated) via a communication conveyance path 82.

A scanner unit 84 for image reading (with an automatic document feeder) is provided on the image forming device 3.

[Variations in Drawing Characteristics of Writing Unit and Density Change]

In the image forming device 3 configured as described above, if there are variations in the drawing characteristics on the photosensitive drum 72 by the respective LEDs 74a of the writing unit 74, a latent image (a dot) having different diameters is formed in locations corresponding to pixels having the same density gradation value on the photosensitive drum 72. If an original document image is printed on the printing paper 31 by transferring a toner image after development of the latent image, a density difference is generated between the pixels in the original document image on the printing paper 31.

Therefore, also in the electrographic image forming device 3, to prevent that a density difference is generated between pixels in the printed image on the printing paper 31, it is necessary to correct an emission intensity of the respective corresponding LEDs 74a of the writing unit 74 that respectively expose locations corresponding to respective pixel on the photosensitive drum 72 according to a density difference between the pixels.

[Density Correction Using Density Correction Profile and Processing Example by Image Forming Device]

In order to correct the emission intensity, as in the above embodiments, a printed image of a test pattern printed on the printing paper 31 by transferring a toner image on the photosensitive drum 72, on which a latent image (a dot) is formed by all the LEDs 74a of the writing unit 74 (corresponding to Step S1 in FIG. 10), is read by the scanner unit 84 under control of the control unit 83 (corresponding to Step S3 in FIG. 10).

The density of respective pixels of an image formed on the printing paper 31 is specified based on the density of respective pixels in the image signal of the read test pattern, to acquire a density profile indicating distribution of the specified density for each pixel (corresponding to Step S5 in FIG. 10).

Further, a pixel region of seven pixels in total, including a pixel of interest having a certain density difference or more from surrounding pixels and three pixels on each side thereof, is extracted as a pixel region of interest from the acquired density profile (corresponding to Step S7 in FIG. 10). The filters B to E, other than the filter A in FIG. 5 to be applied for density smoothing processing of other pixels, are applied for the density smoothing processing of the pixels in the pixel region of interest.

Therefore, the control unit 83 applies the filters B to E in FIG. 5 to respective pixels in the pixel region of interest according to the distance from the pixel of interest, and applies the filter A in FIG. 5 to other respective pixels, to perform filtering for smoothing the density of respective pixels (corresponding to Step S9 in FIG. 10).

The control unit 83 generates a density correction profile based on the density profile after filtering (the density profile after the smoothing processing) according to the same procedure as the correction profile, and causes the generated density correction profile to be memorized in a non-volatile memory (not illustrated) (corresponding to "profile memory unit" in the claims) provided in the control unit 83 (corresponding to Step S11 in FIG. 10), to end a series of processing.

The density correction profile indicates a correction value of the emission intensity (an emission intensity correction value) of the respective LEDs 74a of the writing unit 74 corresponding to respective pixels, so that the respective pixels in the original document image have the same density on the printing paper 31.

The correction profile described above can be generated by obtaining a correction amount of the density that cancels a density difference between respective pixels in the density profile. The density profile defines the density of each pixel on the printed image printed on the printing paper, and can be generated based on the density of each pixel in the image signal of the test pattern read from the printed image of the test pattern by the scanner unit 84.

Variations in the density between pixels corresponding to the respective LEDs 74a can be canceled by correcting the emission intensity of the respective LEDs 74a of the writing unit 74 by using an emission intensity correction value of the correction profile described above (corresponding to "density correction contents" in the claims).

Effects identical to those of the inkjet recording device 1 described first can be acquired even by the stencil printing device 2 in FIG. 11 and the electrophotographic image forming device 3 in FIG. 12 described above.

In the respective embodiments described above, a pixel having a certain density difference or more from surrounding pixels is extracted as the pixel of the "nozzle of interest" or as the pixel of interest. However, instead of this, a pixel in which a density difference from the surrounding pixels corresponds to a preset density difference pattern (for example, a waveform of a density change between pixels, or acceleration of the density change) can be extracted as the pixel of the "nozzle of interest" or as the pixel of interest.

Further, in the respective embodiments described above, a waveform of a filter to be applied according to the distance from the pixel of the "nozzle of interest" or the pixel of interest is assumed to be one pattern for each distance. However, for example, if there are a plurality of criteria for determining a pixel as the pixel of the "nozzle of interest" or as the pixel of interest, the waveform of the filter to be applied according to the distance from the pixel of the "nozzle of interest" or the pixel of interest can be made different for each corresponding criterion.

Accordingly, a filter having a different waveform can be applied to the density smoothing processing depending on the criterion at the time of determining a pixel as the pixel of the "nozzle of interest" or as the pixel of interest according to the distance from the pixel of the "nozzle of interest" or the pixel of interest, so that smooth smoothing processing can be performed by a filter having a waveform suitable for a density difference pattern between the pixels.

Further, according to the respective embodiments described above, as a distance of a pixel from the pixel of the "nozzle of interest" becomes shorter, the filters A to E having a waveform with a fewer number of taps are used for density smoothing processing. However, as long as a range of a target pixel to be applied with a filter becomes narrower as a distance of a pixel from the pixel of the "nozzle of interest" becomes shorter, a filter having a waveform in which the range of the application target pixel of a filter is defined by an element other than the number of taps can be used.

[Effects of Embodiments]

As described above, according to the density correction profile generation method and the image forming device according to the embodiments, a density correction profile that corrects density unevenness in a printed image caused by variations in recording characteristics present between recording elements of a recording head at the time of recording an image on a recording medium by the recording elements can be generated with appropriate contents.

That is, when a printed image is acquired from an image to be recorded on a recording medium by a recording head by a printing job input to the image forming device, recording characteristics of the plurality of recording elements of the recording head that have been used for recording of respective pixels are reflected on recording contents recorded by the recording elements in respective pixels on the recording medium.

Therefore, if there are variations in the recording characteristics of the respective recording elements of the recording head, variations are generated also in the recording contents in respective pixels of an image recorded on the recording medium by the recording head. Due to the variations in the recording contents, variations in the density are generated between respective pixels in a printed image acquired from the image on the recording medium.

Thus, there is a correlation among the recording characteristics of the respective recording elements of the recording head, the recording contents in respective pixels of the image recorded on the recording medium by the recording head, and the density of respective pixels in the printed image acquired from the image on the recording medium.

Therefore, a density profile indicating the density of respective pixels corresponding to the respective recording elements, in the image recorded on the recording medium by the recording head, can be acquired based on the recording characteristics of the respective recording elements of the recording head.

By using the acquired density profile, a correction profile that defines density correction contents for correcting variations in the density of respective pixels in the image on the recording medium caused by the variations in the recording characteristics of the respective recording elements can be generated.

That is, by correcting the recording contents in respective pixels on the recording medium by the respective recording elements of the recording head according to the density correction contents of respective pixels in the correction profile, variations in the density of respective pixels in a printed image acquired from an image on the recording medium can be decreased, thereby enabling to correct density unevenness in the printed image.

If there is a pixel of interest having a certain density difference or more from surrounding pixels in the density profile, according to the density correction profile generation method of the image forming device according to the first aspect of the present invention, a density correction profile in which a function of a filter having a waveform such that as the distance from the pixel of interest becomes shorter, the range of the application target pixel becomes narrower and the peak intensity becomes larger is convoluted in the correction profile is generated.

Generation of the density correction profile can be performed by generating a correction profile from a density profile smoothed by a filter, or by smoothing a correction profile generated from a density profile by a filter.

In the density correction profile generated in this manner, as a pixel has a shorter distance from a pixel of interest, the degree of reflection of a density difference from surrounding pixels in the density correction contents of the correction profile gradually increases continuously, thereby smoothly increasing the degree of suppression of smoothing of the density correction contents of the correction profile.

Accordingly, regarding the pixel of interest, density unevenness in a printed image can be appropriately decreased, by the density correction contents of the density correction profile generated based on the density of the density profile having smoothing suppressed or the density correction contents of the correction profile.

Even if a filter having a waveform different from a filter to be used for smoothing processing of the pixel of interest in which smoothing is suppressed is used as a filter to be used for smoothing processing for pixels other than the pixel of interest, density unevenness in the printed image can be smoothly corrected so that an unnatural density difference is not generated between the pixel of interest and the surrounding pixels according to the smoothed density correction contents.

Therefore, a density correction profile having appropriate contents can be generated.

Further, according to the density correction profile generation method of the image forming device and the image forming device of the present embodiment, a pixel of interest is classified for each density difference pattern from surrounding pixels (for example, a waveform of a density change between pixels, or acceleration of the density change).

A filter having a waveform corresponding to the classification is applied to the density indicated in the density correction contents defined in the correction profile of the pixel of interest and the surrounding pixels thereof in each classification, or the density profile of the pixel of interest and the surrounding pixels thereof in each classification.

Therefore, in the density correction profile having contents in which a filter function is convoluted in the correction profile, a filter having a waveform corresponding to a density difference pattern between a pixel of interest having a certain density difference or more from surrounding pixels and the surrounding pixels is applied to the pixel of interest and the surrounding pixels thereof, thereby enabling to individually set the degree of reflection of the density difference between the pixel of interest and the surrounding pixels in the density correction contents of the density correction profile, for each density difference pattern between the pixels.

Further, according to the density correction profile generation method of the image forming device and the image forming device of the present embodiment, by specifying the density of each pixel by reading a printed image of a test pattern for measurement of density distribution by the scanner, a density profile indicating the density of each pixel in an image on a recording medium having a causal correlation with the specified density of the pixel can be easily acquired.

Further, according to the density correction profile generation method of the image forming device and the image forming device of the present embodiment, by specifying the density of each pixel by printing a printed image of a test pattern for measurement of density distribution and reading the printed image by the scanner, the effects that can be acquired by the density correction profile generation method of the image forming device according to the first aspect of the present invention can be acquired by a single image forming device.

Furthermore, since the density correction profile is memorized in the profile memory unit and recording contents to be recorded in each pixel on a recording medium is corrected according to the density correction contents of the density correction profile, for example, if the recording characteristics of respective recording elements have changed due to replacement of the recording head or the like, a new density correction profile can be generated to update an old density correction profile in the profile memory unit.

Although the contents of the present invention have been described above with reference to the embodiments, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

In is needless to mention that the present invention also includes various embodiments that are not described herein. Therefore, the technical scope of the present invention is to be defined only by the invention specifying matters according to the scope of claims appropriately obtained from the above descriptions.

Respective functions described in the above respective embodiments may be implemented on one or more processing circuits. The processing circuits include programmed processors such as processing devices and the like including electric circuits. The processing devices include devices such as application specific integrated circuits (ASIC) and conventional circuit constituent elements that are arranged to execute the functions described in the embodiments.

This application claims priority based on Japanese Patent Application No. 2017-057432 filed on Mar. 23, 2017, and the entire content of this application is incorporated herein by reference.

INDUSTRIAL APPLICABILITY

According to the present invention, it is possible to generate, with appropriate contents, a density correction profile that corrects density unevenness in a printed image caused by variations in the recording characteristics present between recording elements of a recording head at the time of recording an image on a recording medium by the recording elements.

REFERENCE SIGNS LIST 1 line-type inkjet recording device (image forming device)
2 stencil printing device (image forming device)
3 image forming device
10 control unit
11 external interface unit
14 client terminal
15 external interface unit
16, 90 CPU
17, 91 ROM
18, 92 RAM
19 input unit
20 output unit
21 external storage device
22 disk drive
31 printing paper 32 original document reading mechanism
33 plate making mechanism
34 printing mechanism
35 feed mechanism
36 paper ejection mechanism
37 plate ejection mechanism
38 control unit
40 paper roll
41 guide roller
42 thermal head
42a heating element (recording element)
43 platen roller
44 paper cutter
45 stencil base paper
46 plate cylinder
47 press roll
48 squeegee roll
49 base paper clamp unit
50 disk recording medium
51 feeder
52 scraper
53 pickup roll
54 guide roll
55 timing roll
56 paper stripping claw
57 paper conveying mechanism
58 stacker unit
59 plate ejection guide belt
60 plate ejection roller
61 plate ejection box
62 contamination control guide
71 printing unit
72 photosensitive drum
73 charging roller
74 writing unit
74a LED (light-emitting diode, recording element)
75 developing roller
76 transfer roller
77 paper feed tray
77a first paper feed tray
77b second paper feed tray
77c third paper feed tray
78 straight paper feed stand
79 circulating conveyance path
80 paper ejection tray
81 reversing unit
82 communication conveyance path
83 control unit
84 scanner unit
93 flash memory (profile memory unit)
101 scanner unit
102 printer unit
103 display
110 line head
110a head module
110b nozzle line
110c nozzle (recording element)
160 platen belt
161 drive roller
162 driven roller
500 head holder
500a head holder surface
500b attachment opening
CR1 image forming path

The invention claimed is:

1. A density correction profile generation method for generating a density correction profile that corrects density unevenness caused by recording characteristics of respective recording elements, in a printed image acquired from an image recorded on a recording medium by a recording head having a plurality of recording elements by a printing job input to an image forming device, the method comprising:

acquiring a density profile indicating density of each pixel corresponding to each of the recording elements in an image on the recording medium based on the recording characteristics of the respective recording elements;

extracting a pixel of interest having a certain density difference or more from surrounding pixels in the image on the recording medium based on the density profile; and filtering by generating the density correction profile in which a function of a filter having a waveform with a narrower range of an application target pixel and a larger peak intensity is convoluted in the correction profile as a distance of a pixel from the pixel of interest becomes shorter, based on a correction profile defining density correction contents of each pixel in the image on the recording medium generated based on the density profile, or based on the density profile.

2. The density correction profile generation method according to claim 1, wherein the extracting the pixel of interest includes classifying the pixel of interest into a plurality of pixels according to a density difference pattern from surrounding pixels, and during the filtering, convolution is performed to respectively apply the filter having a waveform corresponding to the density difference pattern in each classification to the density of the pixel of interest and surrounding pixels or to the density correction contents in each classification.

3. The density correction profile generation method according to claim 1, wherein the acquiring the density profile includes:

acquiring a printed image of a test pattern for measurement of density distribution to be recorded on the recording medium by the recording head from an image of the test pattern, and specifying a density of each pixel in the printed image of the test pattern by reading the printed image of the test pattern by a scanner, and the acquiring the density profile acquires the density profile from the specified density of each pixel in the printed image of the test pattern.

4. An image forming device that acquires a printed image from an image to be recorded on a recording medium by a plurality of recording elements of a recording head by an input printing job, the image forming device comprising:

a test pattern acquiring unit that acquires a printed image of a test pattern for measurement of density distribution to be recorded on the recording medium by the recording head from an image of the test pattern;

a pixel density specifying unit that specifies density of each pixel in the printed image of the test pattern from an image signal of the printed image of the test pattern read by a scanner, triggered by a command to acquire a density profile indicating density of each pixel corresponding to each of the recording elements in an image on the recording medium;

a density profile acquiring unit that acquires a density profile indicating density of each pixel in an image on the recording medium based on density distribution in the printed image of the test pattern;

a pixel-of-interest extracting unit that extracts a pixel of interest having a certain density difference or more from surrounding pixels in the printed image based on the density profile;

a filtering unit that generates a density correction profile in which a function of a filter having a waveform with a narrower range of an application target pixel and a larger peak intensity is convoluted in the correction profile as a distance of a pixel from the pixel of interest becomes shorter, based on a correction profile defining density correction contents of each pixel in an image on the recording medium generated based on the density profile, or based on the density profile; and a profile memory unit that memorizes the density correction profile, wherein the respective recording elements of the recording head correct recording contents to be recorded in each pixel on the recording medium according to the density correction contents of the density correction profile in the profile memory unit.

* * * * *